Dec. 30, 1952          H. L. PRICE              2,623,717
     CONTROL SYSTEM FOR CONTROLLED AIRFOILS OF AIRCRAFT
                      Filed Aug. 7, 1947
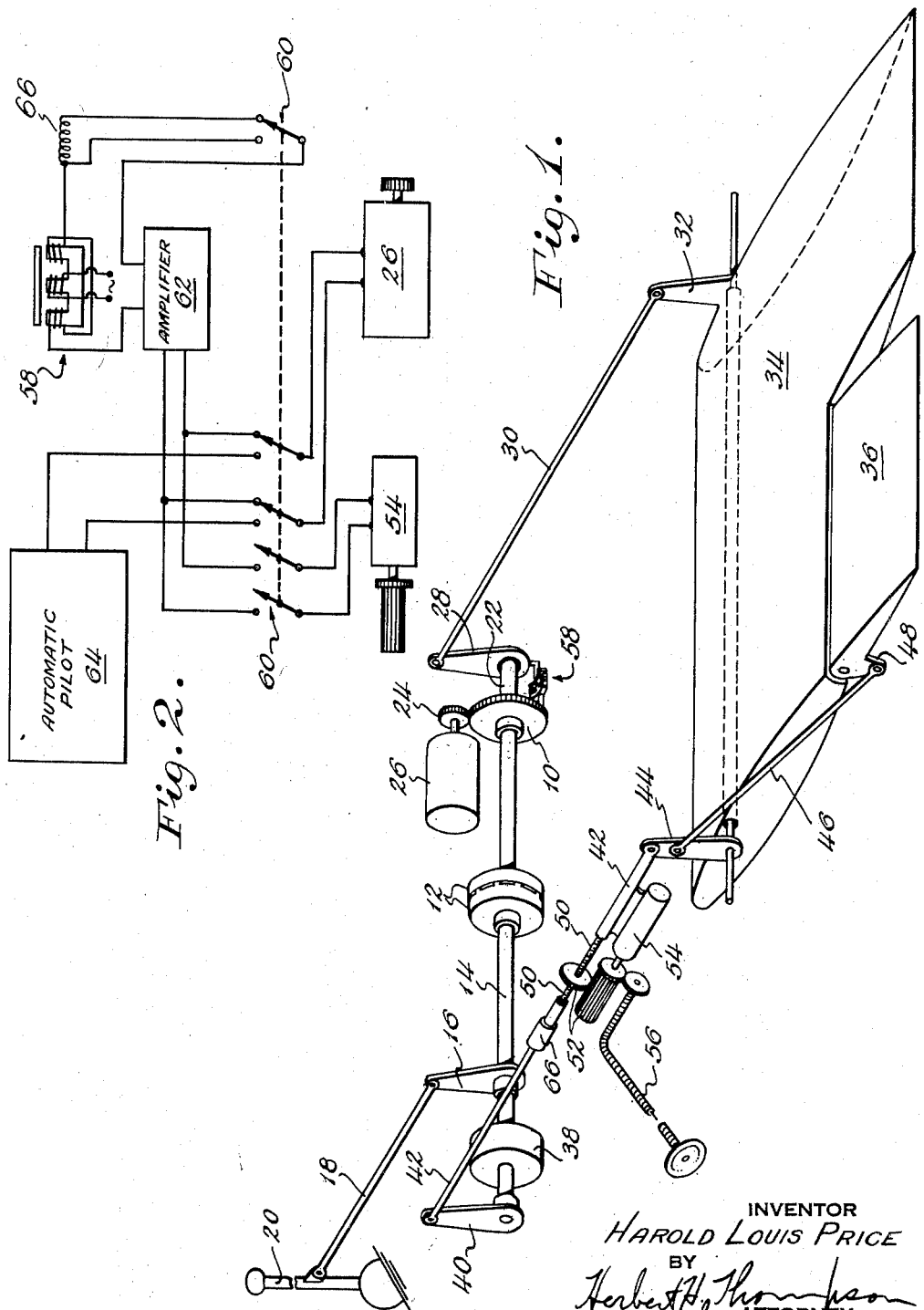
INVENTOR
HAROLD LOUIS PRICE
BY
Herbert H. Thompson
his ATTORNEY.

Patented Dec. 30, 1952

2,623,717

UNITED STATES PATENT OFFICE 2,623,717

CONTROL SYSTEM FOR CONTROLLED AIRFOILS OF AIRCRAFT

Harold Louis Price, Leeds, England, assignor to The Sperry Corporation, a corporation of Delaware Application August 7, 1947, Serial No. 767,041
In Great Britain May 6, 1946

Section 1, Public Law 690, August 8, 1946
Patent expires May 6, 1966

7 Claims. (Cl. 244—82)

This invention relates to control systems for controlled aerofoils, such as ailerons, elevators or rudders, of aircraft and has for its main object to provide an improved power-assisted control system which may be conveniently combined with a form of spring-tab aerodynamically assisted control system, and, at the same time, to provide an improved simple aerodynamic control system that may be alternatively employed with safety in the event, for example, of the failure of the power supply that provides for power assistance. The main objects of the invention therefore are the provision of a composite aerodynamically and power assisted control system of considerable flexibility that is derived from certain novel features and arrangements that will be particularised below.

According to one of the main features of the present invention, a power-assisted control system for a controlled aerofoil comprises a control member (which may or may not be a manually operable control member) connected with the aerofoil, means associated with such connection for deriving a physical quantity that is proportional to the total force to which such connection is subjected, a power operated motor such and so controlled by the physical quantity alone or in combination with other similar physical quantities that it develops an output force at least a component of which is substantially fractionally proportional to the physical quantity (and therefore to the total load to which the said connection is subjected), and a coupling between the motor and the control member, whereby in the said connection a force proportional to the output force developed by the motor is added to or superposed upon such force as may be applied by the control member to the said connection and the control member is thus relieved of a part of the total force to which the said connection is subjected.

The terms force and displacement are herein used, where the context permits, in a generic sense to include their various analogues, such as torque and angular displacement in the case of a rotary mechanical arrangement, or pressure and swept-volume in the case of fluid operated or hydraulic system.

The connection between the control member and the aerofoil may incorporate an elastically deformable element that is strained in proportion to the force to which the connection is subjected, and a strain gauge may be associated with this elastically deformable element to derive a physical quantity that is proportional to the strain of the deformable element and therefore to the total force to which the connection is subjected.

The power assisted control system defined above may with advantage be combined with an aerofoil having an aerodynamic control tab. In such a combination the connection referred to between the control member and the aerofoil may actuate the main part of the aerofoil in one sense and the control member may also be coupled to the control tab so as to actuate it in the opposite sense, the control tab being thus interconnected with the main part of the aerofoil through the elastically deformable element. In such case the strain of the elastically deformable element and the displacement of the control tab relatively to the main part of the aerofoil are proportional to one another and the elastically deformable element performs the functions of the spring of, and the system partakes of the qualities of, an aerodynamically assisted spring tab control system. Thus a feature of the invention consists in the combination with an aerodynamically assisted spring tab control system of a strain gauge associated with the spring tab control system and adapted to produce an output that is a measure of the strain of the spring, and of a power operated motor such, and so controlled by this output, that it develops an output force that depends in sign and magnitude upon the sign and magnitude of the strain of the spring and of means for applying the output force of the motor, alone or in combination with another force or other forces, to the main aerofoil, conveniently through the said spring in such sense as to tend to displace it in the sense opposite to that of the displacement relatively to it of the tab associated with the strain in the spring.

Furthermore the coupling between the control member and the control tab may include a known irreversible device adapted to permit the transmission of force and displacement from the control member to the control tab but to inhibit such transmission from the control tab to the control member except when a force is applied to the control member such as to overcome a small threshold inherent in the irreversible device. The coupling between the control member and the control tab may be adjustable in such a manner that the positional relation between the control tab and the control member and consequently between the control tab and the main part of the aerofoil may be adjusted either automatically or at will. By this means the aerofoil may be substantially trimmed with the aid of the control tab, and the static force set up in the coupling by the tab, when so utilised for trimming is resisted by the irreversible device, if and when the control member is free, instead of being imparted to the control member: the forces and displacements applied to the control member are transmitted in all circumstances through the irreversible connection to the tab and during such transmission are opposed by the forces set up by the tab.

The adjustable coupling between the irreversible device and the control tab may be operated either by means of a power-operated motor or by a manual control whereby the trim of the aerofoil may be adjusted by power means or manually. Preferably both such forms of control are provided for alternative use.

A feature of the invention consists, therefore, in an aerodynamically assisted control system for a controlled aerofoil, wherein the primary control member is connected to the controlled aerofoil or tab thereof through an irreversible mechanical connection adapted to permit the transmission of force and displacement from the control member to the aerofoil or tab but to inhibit such transmission from the aerofoil or tab to the control member except when a force exceeding a certain small threshold value is applied to the control member.

The power operated motor that adjusts the connection between the irreversible device and the control tab may be controlled by, and may be such as to have an output speed depending in sign upon, the measure of the total force to which the connection between the control member and the main part of the aerofoil is subjected.

Moreover, although this power-operated motor may in some cases operate sufficiently rapidly to alter the attitude of the tab relative to the main part of the aerofoil that the force to which the connection between the control member and the main part of the aerofoil is subjected is reduced to zero or to a small value in a time shorter than, or comparable with the average period of normal flying. To control variations in the trimmed state, this motor preferably operates relatively slowly, having a time constant which is longer than the period of any normal flying control variations, so that it operates to set the tab to reduce to near zero the average or trim force to which the connection between the control member and the main part of the aerofoil is subjected.

A feature of the invention therefore consists in a combined aerodynamically and power assisted control system for a controlled aerofoil comprising in combination a control member connected to the main part of the aerofoil, means associated with such connection for deriving a physical quantity that is a measure of the total force to which said connection is subjected, an aerodynamic control tab associated with the aerofoil and adapted when deflected in flight to apply a deflecting torque to the aerofoil, a motor, such as an electric or hydraulic motor, so controlled as to sense of operation in accordance with the said physical quantity and itself irreversible or furnished with an irreversible connection, and so connected with the control tab that the operation of the motor deflects the tab in such a sense that the tab tends to deflect the main part of the aerofoil in the same sense as does the force applied to the main part of the aerofoil through the connection between the control member and the main part of the aerofoil.

In a combined aerodynamically and power assisted control system for an aerofoil in accordance with the invention, means may also be associated with the coupling of a control member to the control tab for deriving a physical quantity that is a measure of the force to which such coupling is subjected by the control tab, and this physical quantity, in combination with that which is a measure of the total force to which the connection between the main part of the aerofoil of the control member is subjected, may be applied to control the power-operated motor.

Accordingly, the invention includes a combined aerodynamically and power-assisted control system for an aerofoil having a control tab comprising means for deriving physical measures of the force to which the control tab and the main part of the aerofoil are separately subjected, power-operated means for developing, combined or separately, forces that are dependent upon these measures, and means for applying such developed forces, separately or jointly, to relieve or reduce the primary forces to which the control member is subjected in producing in any defined conditions any predetermined displacement of the aerofoil. For example, the two measures may be applied in combination to the power-operated means to cause it to apply to the control member a force that comprises additive components dependent upon each of the measures. Alternatively the physical measure of the force to which the control tab is subjected may be applied to a servo-device incorporated in the coupling between the control member and the control tab, so as to relieve the control member of some or all of the total force to which such coupling is subjected by the control tab; and the physical measure of the force to which the connection to the main portion of the aerofoil is subjected may then be applied to a servo-device incorporated in that connection so as to relieve the control member of a part of the total force to which that connection is subjected by the main part of the aerofoil.

The coupling to the control tab may, in accordance with the invention, be connected to the control member through a clutch and a manually operable control device may be connected to actuate directly the coupling to the control tab. The clutch may be held into engagement by power derived from that source from which operates the power-operated motor, and may be such as to be automatically disengaged in response to failure of such power. If, therefore, the power fails, the manually operable control device acts through the coupling directly upon the control tab to produce simple aerodynamic servo-tab control of the aerofoil. If desired, manually operable means may also be provided for disengaging the clutch at will.

I have discovered that certain advantages accrue from a special relationship between the forces to which the main part of the aerofoil and the control tab are separately subject and the assistance forces developed by the power-operated means and applied severally to the main part of the aerofoil and to the control tab. Thus, in a preferred form of the invention, a combined aerodynamically and power-assisted control system for an aerofoil having an aerodynamic control tab comprises: a control member; an effective elastic connection between the control member and the main part of the aerofoil; an effective rigid connection between the control member and the control tab; adjusting means in one of the two said connections whereby the static or average displacement of the control tab relative to the main part of the aerofoil may be adjusted at will in order to trim the aerofoil as a whole; and power-operated means arranged to exert upon either or both of the main part of the aerofoil and the control tab assistance forces that are related to one another and to the forces exerted by the main part of the aerofoil and by the control tab. This relation may be such that, substantially, the product of the amount of assistance force exerted by the power-operated means upon the control tab that is proportional to the force exerted by the main part of the aerofoil, and of the amount of assistance force exerted by the power-operated means upon the main part of the aerofoil that is proportional to the force exerted by the control tab is equal to the product of the residuum of the force exerted by the main part of the aerofoil that is not met by that amount of assistance force that is exerted by the power-operated means on the main part of the aerofoil and that is proportional to the force exerted by the main part of the aerofoil, and of the residuum of the force exerted by the control tab, that is not met by that amount of assistance force that is exerted by the power-operated means upon the control tab and that is proportional to the force exerted by the control tab.

In one form of the invention, the assistance force exerted by the power operated means on the control tab may be represented by the expression $(p_1X + q_1Y + r_1\varphi)$ and the assistance force exerted by the power operated means on the main part of the aerofoil may be represented by the expression $(p_2X + q_2Y + r_2\varphi)$; where in each instance X is the force exerted by the main part of the aerofoil, Y is the force exerted by the control tab, $\varphi$ is the deformation of the elastically deformable element, and $p_1$, $p_2$, $q_1$, $q_2$, $r_1$ and $r_2$ are arbitrary parameters.

The relation between the noted parameters for one form of the invention may be $$p_1 \times q_2 \cong (1-p_2) \times (1-q_1)$$

In this form of the invention the mean angular position of the control tab with reference to the main part of the aerofoil, that is required to trim the aerofoil as a whole to any predetermined angle without requiring the exertion of force by the control member, is rendered substantially independent of the air-speed of the aerofoil, and, consequently, the adjustment for trim of the adjusting means furnished in one of the two connections is substantially independent of air-speed.

This form of the invention may be carried out in many manners, of which two have peculiar advantages, those two both involving power-operated means arranged to exert upon the control tab a force of which at least a component is equal to the total force exerted by the control tab; in short, the quantity $q_1$ in the above expression is caused to be unity. If such arrangement be adopted, the power-operated means may be arranged additionally to exert, either upon the control tab or upon the main part of the aerofoil, a force that is less than, but otherwise has any desired proportionality to the force exerted by the main part of the aerofoil; in short either $p_1$ or $p_2$ may be given any desired fractional value, the other being zero.

In the former arrangement the power-operated means may comprise but a single power-operated device of the kind in which the output force is proportional to an input signal, arranged to operate upon the rigid connection to the control tab and to receive an input signal comprising a component that is proportional to the force exerted by the control tab and another component differently proportional to the force exerted by the main part of the aerofoil, a measure of which latter force is in this instance provided by deformation of the elastically deformable member. In this case, in general, the elasticity of the connection between the control member and the main part of the aerofoil should be considerable, so that this connection transmits great force with little deformation.

In another arrangement, on the other hand, the power-operated means may comprise two power-operated devices, one acting upon or co-operating with the rigid connection to the control tab and the other acting upon the main part of the aerofoil. That acting upon or co-operating with the rigid connection to the control tab may be of the positional follow-up kind that meets the whole of the load applied to it, and may conveniently be hydraulic. That acting upon the main part of the aerofoil may be of the kind which relieves its controlling means of a predetermined proportion of the force that it is called upon to exert, or exerts, a force that is a multiple of the applied control force. One example of the latter kind of power-operated device is described in British patent specification No. 545,296. In this second arrangement the elasticity of the connection between the control member and the main part of the aerofoil will be relatively small, so that this connection transmits a relatively small force with relatively great deformation.

For the better understanding of the invention it will now be described in some detail with reference to the accompanying drawing in which:

Fig. 1 is a diagrammatic perspective view of the general arrangement of one form of control system in accordance with the invention, and Fig. 2 is a circuit diagram showing one form of the essential electrical circuits employed in conjunction with the arrangement shown in Fig. 1.

Referring now to Fig. 1 of the accompanying drawing, a control member in the form of a gear wheel 10 is mechanically coupled on the one hand through a suitable form of electromagnetic jaw clutch 12, such, for instance, as shown in the patent to Kronenberger, No. 2,356,597, dated August 22, 1944, to a shaft 14, to which is connected by a lever 16 and connecting rod 18 a manually operable primary control member taking the form of a pilot's control column 20, and on the other hand to one end of a torsion bar 22. The gear wheel 10 is adapted to be driven by a pinion 24 carried upon the shaft of an electric or hydraulic motor 26 of the nature that produces an output torque that is proportional to a control signal supplied to it. The electromagnetic clutch 12 is energised from a main source of electrical supply, not shown, that serves the remainder of the control system so that, if this supply fails or is switched off, the clutch 12 is de-energised and therefore disconnected.

The other end of the torsion bar 22 is connected by a lever 28 and rod 30 to a lever 32 that controls the main part 34 of an aerofoil equipped with a control tab 36. The torsion bar 22 thus constitutes an elastically deformable element incorporated in a common connection to the main part 34 of the aerofoil through which common connection forces are applied both by the primary control member constituted by the control column and by the primary power operated motor 26. For the purpose of the present description the aerofoil is considered to be an elevator. The shaft 14 which is connected to the control column is coupled through an irreversible device 38, which may conveniently be of the form described in British patent specification No. 565,920, to the tab 36 by a lever 40 and rod 42 to a lever 44 that is journalled coaxially with the axis of rotation of the main part 34 of the elevator. This lever 44 is coupled by a rod 46 to another lever 48 which actuates the tab 36, this latter coupling being so arranged that, when the gear wheel 10 is rotated it tends to rotate the main part 34 of the elevator and the tab 36.

The coupling between lever 40 and the lever 44 is adjustably extensible, for example including a screw jack 50. The screw jack may be operated by means of a pinion and gear wheel combination 52 and may be driven alternatively by means of an auxiliary power-operated motor 54 or manually by means of a flexible shaft 56 from a trim-wheel in the pilot's cockpit. The pinion of the pinion and gear wheel combination 52 is fixedly mounted on the central threaded portion of the jack 50. The auxiliary motor 54 is preferably such that its speed depends upon an electrical signal applied to it.

Means are provided for deriving a measure of the elastic deformation of the torsion bar 22 by the force transmitted thereby to the main part 34 of the elevator. In particular this means may comprise an electrical pick-off 58, including a three-limbed E-shaped core having windings on each of the three limbs and co-operating with an armature, the core being carried in fixed relation to one end of the torsion bar 22, whilst a co-operating armature is carried in fixed relation to the other end of the torsion bar 22. Pick-off 58 measures the twist in bar 22 about an axis coincident with the axis of shaft 14. Conventional elements of this character are shown and described in the patents to Wittkuhns et al., No. 1,959,804, dated May 22, 1934, and to Langer et al., No. 2,346,976, dated April 18, 1944.

If desired, means may be associated with the coupling between the irreversible device 38 and the lever 48, which controls the tab, for providing a measure of the force to which that coupling is subjected, and such measure may also be in the form of an electrical signal which may be combined with or added to that from the electrical pick-off previously referred to. This means may take the form of an electrical strain gauge 66 associated with the rod 42.

Referring to Fig. 2 a change-over electric switching arrangement 60 is provided by which may be applied to the motor 26 alternatively at will the sum of the measure of the elastic deformation of the torsion bar 22 furnished by the pick-off 58 and of the measure that is provided by the electrical strain gauge 66, amplified to the required level by an amplifier 62, or an external signal such as the output signal given by a conventional automatic pilot 64. Moreover, the switching arrangement may, as shown, be such that, when the power-operated motor 26 is controlled by an external signal, as from the automatic pilot 64, the measure of the elastic deformation of the torsion bar 22 provided by the electrical pick-off 58 and amplifier 62 is applied to control the auxiliary power-operated motor 54 that drives the screw jack 50 included in the coupling between the lever 40 and the lever 44.

The bar 22 and pick-off 58 constitute a strain gauge and the gauge schematically indicated at 66 in the drawing may be formed similarly as shown in the patent to Langer et al., No. 2,354,130, dated July 18, 1944, or Burgwin et al., No. 2,231,702, dated February 11, 1941.

In the normal operation of the control system described, when the output from the automatic pilot 64 controls the power-operated motor 26, and therefore the gear wheel 10, the latter is rotated by the torque delivered by the power-operated motor 26, thus applying forces correspondingly to both the tab 36 and the main part 34 of the elevator. The force applied to the main part 34 of the elevator strains the torsion bar 22 and relatively displaces the armature and core of the electrical pick-off 58 to produce a signal therefrom which is proportional to the force to which the connection between the gear wheel 10 and the main part 34 of the elevator is subjected and is proportional also to the relative displacement of the control tab 36 and the main part 34 of the elevator. This signal is applied through the switching arrangement 60 to the auxiliary motor 54 by which the screw jack 50 is operated. This motor, having a moderately long time constant, operates to adjust the jack 50. The tab 36 is thus gradually deflected in such a sense as to cause the main part 34 of the elevator to deflect in the same sense as that in which the force applied to it through the torsion bar 22 tends to deflect it. The operation of the auxiliary electric motor 54 persists until the force in the connection to the main part 34 of the elevator substantially vanishes, and consequently, the output of the electrical pick-off 58 becomes zero, when the auxiliary motor 54 stops. In these circumstances the elevator is substantially trimmed having regard to the average conditions of flight, and the average force reaction experienced at the gear wheel 10 is small.

In these circumstances the clutch 12 interposed between the control member 10 and the primary control member constituted by the pilot's control column 20, is, of course, engaged. If the pilot desires to supercede the control of the automatic pilot and to control the machine manually, he may change over the electrical connections by means of the switching arrangement 60 so that the power-operated motor 26 is controlled, instead of by the automatic pilot 64, by the output of the electric pick-off 58 associated with the torsion bar 22. In this case the manual operation has properties of feel and of manipulation similar to those of an ordinary aerodynamic assisted spring tab control system, but the force which the pilot is required to exert upon the primary control column 20 is reduced by the force furnished by the power-operated motor 26. If there are also means such as the strain gauge 66 associated with the coupling between the irreversible device 38 and the lever 48 which controls the tab 36 for providing a measure of the force to which the coupling is subjected and for adding this measure to that from the pick-off 58 associated with the torsion bar, the force supplied by the power-operated motor 26 will be increased by a corresponding amount and that which must be supplied by the pilot is correspondingly decreased.

In these conditions the pilot is able by means of a trim wheel acting through the flexible shaft 56 to adjust the screw jack 50 in the coupling between the irreversible device 38 and the tab 36, thus semi-permanently setting the tab 36, and consequently, the main part 34 of the elevator to secure correct trim.

If the power supply to the system should fail, not only is the gear wheel 10 freed from restraint by the power-operated motor 26 but also the electro-magnetic clutch 12, by which it is connected to the control column 20 and through the irreversible device 38 to the tab 36, is disengaged. In these circumstances the main part 34 of the elevator is unrestrained by the control system, but the tab 36 is directly controlled from the control column 20 through the irreversible device 38 and extensible coupling 50, so that the system now presented to the pilot has the characteristics of a simple aerodynamic servo-tab, control system. Moreover the irreversible device 38 operates to relieve the pilot of withstanding the static force required for trimming purposes, although he must withstand this trimming force whenever he applies a small force to the control column 20 in either direction.

As shown in Fig. 2 the strain gauge 66 is connected in series with pick-off 58 by the switching device 60, when the latter is in the position in which the amplifier 62 controls the motor 26. When, however, the switching device 60 is in such a position that the motor 26 is controlled by the automatic pilot 64 and the amplifier 62 is connected with the auxiliary motor 54, the strain gauge 66 is isolated.

In the arrangement shown in Figs. 1 and 2, the pick-off 58 furnishes a measure of the force X exerted by the main part 34 of the aerofoil, and the strain gauge 66 furnishes a measure of the force Y exerted by the control tab 36. At least, a component of the force that the motor 26 exerts upon the control tab 36 is proportional to the force Y exerted by the control tab. In this form of the invention, as previously referred to, the quantity $q_1$ is substantially unity. The strain gauge 66, amplifier 62 and motor 26 are preferably so chosen that the force exerted by the motor 26 upon the rigid connection to the tab 36 in response to a signal from the strain gauge 66 is equal to and balances substantially the force Y exerted by the tab 36 in the strain gauge 66. In addition to this component of force, that is proportional to the force exerted by the tab 36, the motor 26 also exerts a further component in response to the control of the pick-off 58, and this component may have any desired fractional proportionality with the force exerted by the main part 34 of the aerofoil. The quantity $p_1$, referred to previously, provides a value corresponding to this desired fraction. In this case the elasticity of the torsion bar 22 should be considerable so that it transmits great force with little deformation. With this arrangement the degree of extension of the jack 50 needed to hold a given trim angle of the elevator 34 is independent of speed. In the operation of the system by the manually operable member 20, force on the member initially exerts a torque on shaft 14 and strains the deformable connection 22. The signal means 58 is then rendered effective to operate the motor 26 to move the tab 36 and main surface 34. The aerodynamic force of the tab 36 with such movement also causes the surface 34 to move in the direction initiated by the motor 26. Such movement of the surface 34 reduces the deformation in the connection 22 as less torque from the power motor 26 is then required to position the surface 34. This action also causes a reduction in the output of the signal means 58. However, the surface 34 and tab 36 move under the combined influence of the manually operable member 20, the motor 26 and the aerodynamic force obtained from the tab 36 until a steady state is reached in which the aerodynamic load on the surface 34 is balanced by the forces of the three noted influences. In this state, the control signal for power motor 26 is just sufficient to cause the motor to provide the amount of torque necessary for it to supply its share of the force needed to position the surface 34. With a change in either, the input to the motor 26, the force of member 20 or the aerodynamic force of tab 36, a steady state no longer exists and therefore the surface 34 and tab 36 move to seek a further balanced condition. If, for example, member 20 is released, the total force acting on surface 34 is no longer sufficient to hold it in its attained position. With loss of the manual force and continuous reduction in the influence of the tab 36 on surface 34, the surface 34 slowly returns to a condition in which the output from signal means 58 is null.

It will be appreciated that certain forms of the invention have been described in detail with reference to, and one specific form is shown in, the accompanying drawing by way of example only and that many modifications may be made without departing from the scope of the invention.

What I claim is:

1. In a control system for aircraft with an aerofoil having a main control surface and a spring tab, a manually operable member operatively connected to said surface and tab, means for producing a signal in accordance with the force exerted on the surface from said member, means for producing a signal in accordance with the force exerted on the tab from the member, and a power motor connected to said surface and tab operated by the combined signals of said first and second signal means.

2. In a control system for aircraft with an aerofoil having a main control surface and a spring tab, a manually operable member operatively connected to said surface and tab, a connection between said member and surface having an elastically deformable area therein, a connection between said member and tab having a strain area therein, signal means for providing an output proportional to the deformation in the deformable area of said first connection, signal means for providing an output proportional to the strain in the strain area of said second connection, and a power motor connected to said surface and tab operated by the combined output of said first and second signal means.

3. A system as claimed in claim 2 in which the connection between the member and tab includes an irreversible device.

4. A system as claimed in claim 2, in which the connection between the member and surface includes a clutch.

5. A system as claimed in claim 2, in which the connection between the member and tab includes adjustable means for changing the effectiveness of the tab, and means for setting said adjustable means at will.

6. In a control system for aircraft with an aerofoil having a main control surface and a spring tab, a power motor operatively connected to said surface and tab, means for producing a signal in accordance with the force exerted by said power motor to move said surface, and motor means for adjusting the trim of the tab operated by said signal means.

7. In a control system for aircraft with an aerofoil having a main control surface and a spring tab, a manually operable member operatively connected to the surface and tab, a power motor operatively connected to the surface and tab, a connection between said power motor and surface having an elastically deformable area therein, and signal means providing an output proportional to the deformation in the deformable area of said connection for operating said power motor.

HAROLD L. PRICE.

REFERENCES CITED

The following references are of record in the file of this patent:

UNITED STATES PATENTS

| Number | Name | Date |
|---|---|---|
| 2,183,932 | Carlson | Dec. 19, 1939 |
| 2,272,725 | Overbeke | Feb. 10, 1942 |
| 2,277,378 | Wells | Mar. 24, 1942 |
| 2,325,548 | Roos | July 27, 1943 |
| 2,394,384 | Horstmann | Feb. 5, 1946 |
| 2,395,671 | Kleinhans | Feb. 26, 1946 |
| 2,445,900 | Wisman | July 27, 1948 |

FOREIGN PATENTS

| Number | Country | Date |
|---|---|---|
| 221,794 | Switzerland | Sept. 16, 1942 |